US007614012B1

(12) United States Patent
Dulaney

(10) Patent No.: US 7,614,012 B1
(45) Date of Patent: Nov. 3, 2009

(54) METHODS AND APPARATUS FOR GRAPHICAL OBJECT IMPLEMENTATION

(75) Inventor: Marissa H. Dulaney, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 249 days.

(21) Appl. No.: 11/315,027

(22) Filed: Dec. 22, 2005

(51) Int. Cl.
  *G06F 3/048* (2006.01)
  *G06F 3/00* (2006.01)
(52) U.S. Cl. .................. 715/838; 715/716; 715/723; 715/726; 715/835
(58) Field of Classification Search .............. 715/716, 715/723, 726, 835, 838, 764
See application file for complete search history.

(56) References Cited

U.S. PATENT DOCUMENTS

| | | | | |
|---|---|---|---|---|
| 5,404,316 | A * | 4/1995 | Klingler et al. ............. | 715/723 |
| 5,999,173 | A * | 12/1999 | Ubillos ....................... | 715/724 |
| 6,204,840 | B1* | 3/2001 | Petelycky et al. ......... | 715/500.1 |
| 6,928,613 | B1* | 8/2005 | Ishii et al. .................. | 715/726 |
| 7,073,127 | B2* | 7/2006 | Zhao et al. ................. | 715/719 |
| 2001/0040592 | A1* | 11/2001 | Foreman et al. ............. | 345/723 |
| 2003/0016947 | A1* | 1/2003 | Ishii ............................ | 386/52 |
| 2004/0095396 | A1* | 5/2004 | Stavely et al. .............. | 345/838 |
| 2004/0100487 | A1* | 5/2004 | Mori et al. .................. | 345/724 |
| 2005/0283741 | A1* | 12/2005 | Balabanovic et al. ....... | 715/838 |
| 2006/0282759 | A1* | 12/2006 | Collins et al. ............... | 715/500 |
| 2007/0136750 | A1* | 6/2007 | Abanami et al. ............. | 725/44 |

* cited by examiner

*Primary Examiner*—Steven P Sax
*Assistant Examiner*—Grant D Johnson
(74) *Attorney, Agent, or Firm*—Chapin IP Law, LLC; Barry W. Chapin, Esq.

(57) ABSTRACT

A system displays a graphical element in a graphical user interface, and receives a command to display the at least one graphical sub-element associated with the graphical element. The system replaces the display of the graphical element with a display of at least one graphical sub-element associated with the graphical element, and implements the graphical sub-element such that execution of the graphical element invokes execution of the graphical sub-element associated with the graphical element.

22 Claims, 9 Drawing Sheets

212 DISPLAY THE SUB-ELEMENT IDENTIFIER WITH AN INDICATION OF A TYPE OF GRAPHICAL SUB-ELEMENT ASSOCIATED WITH THE GRAPHICAL ELEMENT.

213 DISPLAY THE SUB-ELEMENT IDENTIFIER WITH AN INDICATION OF A VISUAL EFFECT TO EXECUTE UPON EXECUTION OF THE GRAPHICAL ELEMENT

214 DISPLAY THE SUB-ELEMENT IDENTIFIER WITH AN INDICATION OF A VISUAL EFFECT OF A PAN AND ZOOM EFFECT ON THE GRAPHICAL ELEMENT WHEREBY A FIRST PORTION OF THE AT LEAST ONE GRAPHICAL SUB-ELEMENT IS EXPANDED FOLLOWED BY A MOVEMENT TO A SECOND PORTION OF THE AT LEAST ONE GRAPHICAL SUB-ELEMENT WHERE THE SECOND PORTION OF A GRAPHICAL SUB-ELEMENT IS EXPANDED

*FIG. 7*

METHODS AND APPARATUS FOR GRAPHICAL OBJECT IMPLEMENTATION

BACKGROUND

Conventional computerized devices, such as personal computers, laptop computers, and the like utilize graphical user interface in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects, such as a storyboard, by dragging and dropping graphical objects (i.e., text, text boxes, images, etc) into the document and/or project. A storyboard is a digital visual overview of a sequence of events, where each event is an element in the storyboard, usually represented by a thumbnail image or icon. There may be different visual items in the storyboard to represent different types of elements. Each type of element is identically sized regardless of the length of time of the entry (unlike a timeline where the physical size denotes length of time). This is usually used when creating a video or a slideshow, but can be used to for other purposes as well, such as planning a process. Sub-elements (such as timelines, videos, additional information about the element, etc) can be attached to an element in the storyboard, and invoked during execution of the storyboard. For example, a sub-element, such as a video, can be attached to an element, such as a thumbnail image. During execution of the storyboard, when the sequence of events reaches the element (i.e., the thumbnail image), the video (i.e., the sub-element attached to the element) is played. It is this association of sub-elements to elements in the storyboard that work together to create a more interesting tale for the storyboard.

SUMMARY

Conventional technologies for editing storyboards suffer from a variety of deficiencies. In particular, conventional technologies for editing storyboards are limited in that only high-level views of elements (i.e., the high level thumbnail images) in the storyboard are shown within the graphical user interface used to develop the storyboard. The underlying sub-elements (i.e., videos, timelines, visual effects, etc) are not shown along with the high level elements, making it difficult for a storyboard developer to keep track of all sub-elements associated with their respective elements. Additionally, efforts to access the sub-elements (i.e., for modification, etc) associated with elements (i.e., the high level thumbnail images) in the storyboard require additional efforts of the storyboard developer to locate those sub-elements.

Embodiments disclosed herein significantly overcome such deficiencies and provide a system that includes a computer system executing a graphical element displaying process within a graphical user interface. The graphical element displaying process allows a user to expand an element (i.e., a thumbnail image) within a storyboard to view the sub-elements associated with that element. This allows the user to view the sub-elements alongside the other elements in the context of the storyboard. The user can modify the sub-elements, and view how this modification will affect the transition in the storyboard from the sub-elements (being modified) to the next element in the sequence of elements within the storyboard. When finished modifying the sub-elements, the user can collapse the sub-elements to view only the element (i.e., the thumbnail image) associated with those sub-elements. This ability to expand and collapse elements within the storyboard allows a user to more efficiently navigate the storyboard.

The graphical element displaying process displays the graphical element, and receives a command to display at least one graphical sub-element associated with the graphical element. The graphical element displaying process replaces the display of the graphical element with a display of at least one graphical sub-element associated with the graphical element. The graphical element display process then implements the graphical sub-element such that execution of the graphical element invokes execution of the graphical sub-element associated with the graphical element. In one embodiment, the graphical element displaying process receives a command to display the graphical element; and replaces the display of the graphical sub-element associated with the graphical element with the display of the graphical element. Thus, a user can expand the graphical element to view the associated graphical sub-elements and also collapse the graphical sub-elements to view the associated element.

During an example operation of one embodiment, suppose a user, such as a graphical designer, is creating a project containing a storyboard. The storyboard contains a series of thumbnail images. Some of the thumbnail images have videos attached to them; others have visual effects (i.e., "pan and zoom", etc). The graphical designer can select one of the thumbnail images, expanding that thumbnail image to display the sub-elements (i.e., a video, visual effect, etc) associated with that thumbnail image. Within the storyboard, the graphical designer can view the sub-elements associated with the selected thumbnail, while still viewing the other thumbnail images in the storyboard (i.e., the non-selected thumbnail images). The graphical designer can now modify the sub-elements in the context of the whole storyboard (i.e., the non-selected thumbnail images), allowing the graphical designer to view how the sub-elements will impact the storyboard as a whole.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 illustrates a flowchart of a procedure performed by the system of FIG. 1 when the graphical element displaying process displays the sub-element identifier with an indication of a type of graphical sub-element associated, according to one embodiment disclosed herein.

DETAILED DESCRIPTION

Embodiments disclosed herein include methods and a computer system that perform a graphical element displaying process within a graphical user interface. The graphical element displaying process allows a user to expand an element (i.e., a thumbnail image) within a storyboard to view the sub-elements associated with that element. This allows the user to view the sub-elements alongside the other elements in the context of the storyboard. The user can modify the sub-elements, and view how this modification will affect the transition in the storyboard from the sub-elements (being modified) to the next element in the sequence of elements within the storyboard. When finished modifying the sub-elements, the user can collapse the sub-elements to view only the element (i.e., the thumbnail image) associated with those sub-elements. This ability to expand and collapse elements within the storyboard allows a user to more efficiently navigate the storyboard.

The graphical element displaying process displays the graphical element, and receives a command to display at least one graphical sub-element associated with the graphical element. The graphical element displaying process replaces the display of the graphical element with a display of at least one graphical sub-element associated with the graphical element, and implements the graphical sub-element such that execution of the graphical element invokes execution of the graphical sub-element associated with the graphical element. In one embodiment, the graphical element displaying process receives a command to display the graphical element; and replaces the display of the graphical sub-element associated with the graphical element with the display of the graphical element. Thus, a user can expand the graphical element to view the associated graphical sub-elements and also collapse the graphical sub-elements to view the associated element.

Figure 1:
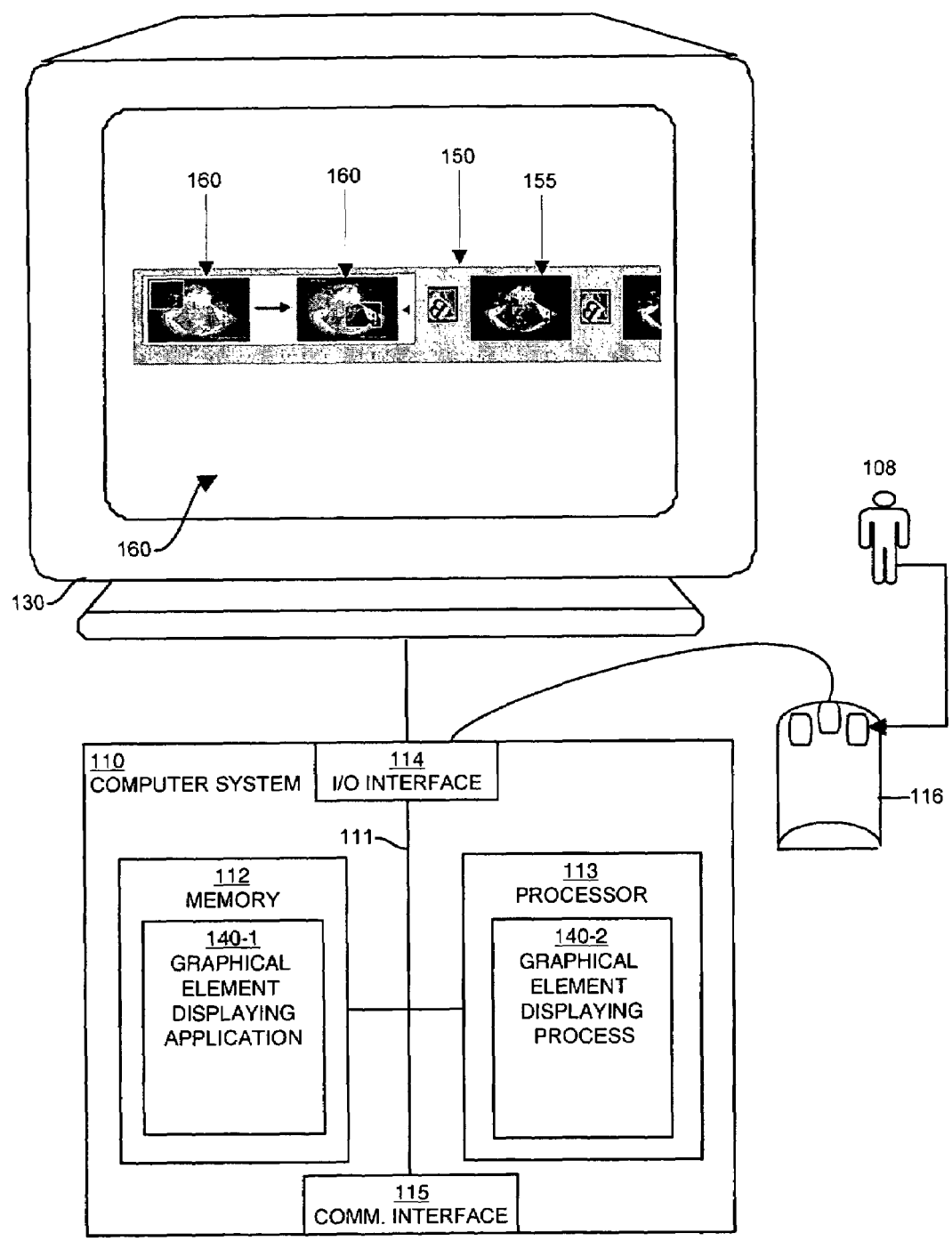
FIG. 1 shows a high-level block diagram of a computer system according to one embodiment disclosed herein.

FIG. 1 is a block diagram illustrating example architecture of a computer system 110 that executes, runs, interprets, operates or otherwise performs a graphical element displaying application 140-1 and graphical element displaying process 140-2 suitable for use in explaining example configurations, according to one embodiment disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 161 that the graphical element displaying application 140-1 and process 140-2 provides on the display 130. The graphical user interface 161 displays a storyboard 150 containing a graphical element 155 and graphical sub-elements 160. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a graphical element displaying application 140-1 as explained herein. The graphical element displaying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the graphical element displaying application 140-1. Execution of the graphical element displaying application 140-1 in this manner produces processing functionality in a graphical element displaying process 140-2. In other words, the graphical element displaying process 140-2 represents one or more portions or runtime instances of the graphical element displaying application 140-1 (or the entire graphical element displaying application 140-1) performing or executing within or upon the processor 113 in the computerized device 110 at runtime.

It is noted that example configurations disclosed herein include the graphical element displaying application 140-1 itself (i.e., in the form of un-executed or non-performing logic instructions and/or data). The graphical element displaying application 140-1 may be stored on a computer readable medium (such as a floppy disk), hard disk, electronic, magnetic, optical, or other computer readable medium. The graphical element displaying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the graphical element displaying application 140-1 in the processor 113 as the graphical element displaying process 140-2 including the managing application process 150. Those skilled in the art will understand that the computer system 110 may include other processes and/or software and hardware components, such as an operating system not shown in this example.

A display 130 need not be coupled directly to computer system 110. For example, the graphical element displaying application 140-1 can be executed on a remotely accessible computerized device via the network interface 115. In this instance, the graphical user interface 161 may be displayed locally to a user 108 of the remote computer and execution of the processing herein may be client-server based.

Figure 2:
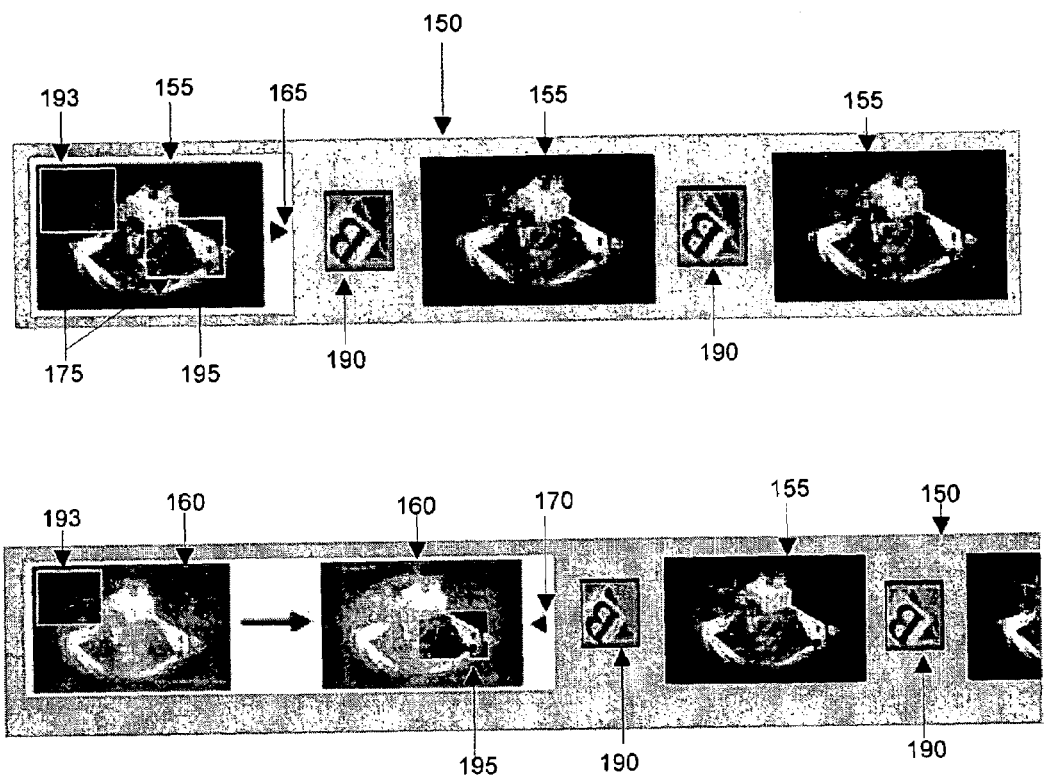
FIG. 2 shows an example screenshot of a storyboard containing elements and sub-elements where the sub-elements display a visual effect, according to one embodiment disclosed herein.

FIG. 2 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 2 displays an example of a type 175 of graphical sub-element 160 associated with the graphical element 155. In this example, a visual effect called "pan and zoom" is indicated, where a first area 193 is displayed, and then a second area 195 is displayed. The storyboard also displays transition effects 190 that occur between the displaying of each of the graphical elements 155 in the sequence of graphical elements 155 that make up the storyboard 150. The graphical sub-elements 160 contain an element identifier 170, that, when selected, collapses the graphical sub-elements 160 to display the graphical element 155 associated with those graphical sub-elements 160.

Figure 3:
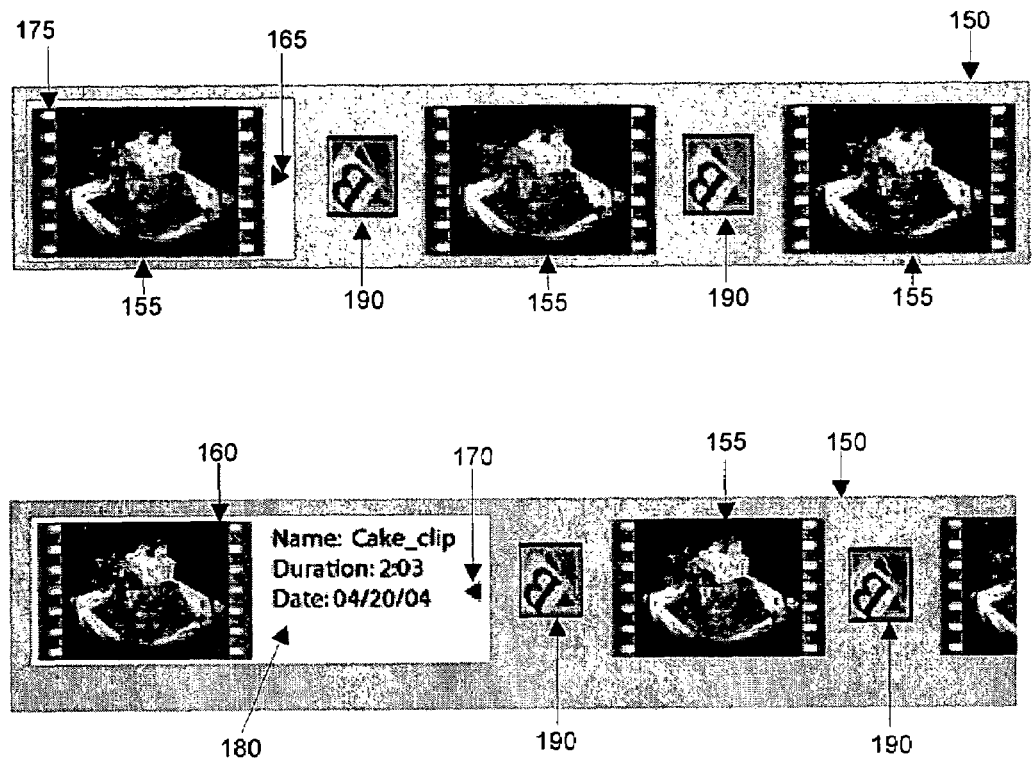
FIG. 3 shows an example screenshot of a storyboard containing elements and sub-elements where the sub-elements display a video attached to the element, according to one embodiment disclosed herein.

FIG. 3 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 3 displays an example of a type 175 of graphical sub-element 160 associated with the graphical element 155. In this example, a video 180 is the graphical sub-element 160 associated with the graphical element 155, and this is indicated by the film tracking icon (i.e., the type 175 of graphical sub-element 160) surrounding the graphical element 155. The storyboard also displays transition effects 190 that occur between the displaying of each of the graphical elements 155 in the sequence of graphical elements 155 that make up the storyboard 155. The graphical sub-elements 160 contain an element identifier 170, that, when selected, collapses the graphical sub-elements 160 to display the graphical element 155 associated with those graphical sub-elements 160.

Figure 4:
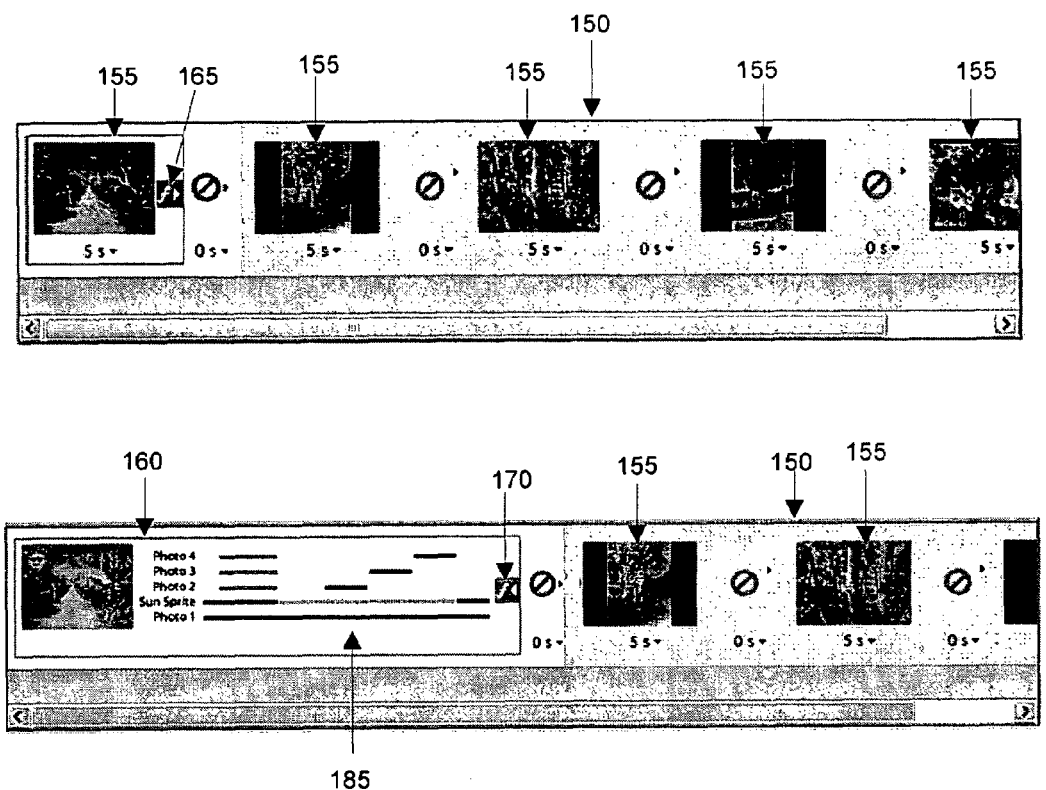
FIG. 4 shows an example screenshot of a storyboard containing elements and sub-elements where the sub-elements display a timeline, according to one embodiment disclosed herein.

FIG. 4 displays an example screen shot of a storyboard 150 containing graphical elements 155, one of which has been expanded to display the graphical sub-elements 160 associated with the expanded graphical element 155, according to one embodiment disclosed herein. The expanded graphical element 155 includes a sub-element identifier 165, that, when selected, displays the graphical sub-elements 160. FIG. 4 displays a timeline 185 indicating a series of graphical sub-elements 160 and a time duration of each of the graphical sub-elements 160 listed in the timeline 185. The graphical sub-elements 160 contain an element identifier 170, that, when selected, collapses the graphical sub-elements 160 to display the graphical element 155 associated with those graphical sub-elements 160.

Further details of configurations explained herein will now be provided with respect to a flow chart of processing steps that show the high level operations disclosed herein to perform the graphical element displaying process 140-2.

Figure 5:
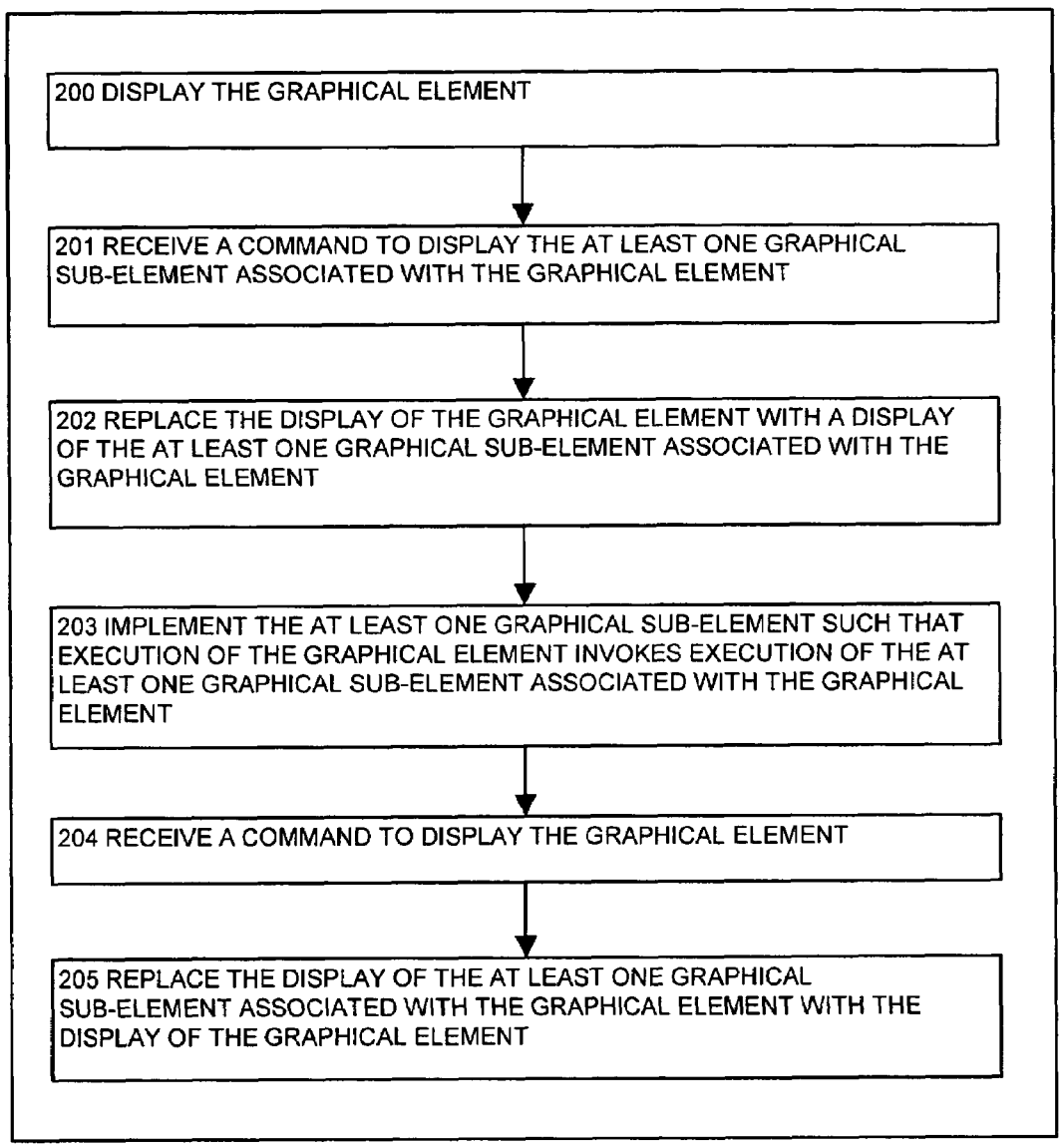
FIG. 5 illustrates a flowchart of a procedure performed by the system of FIG. 1 when the graphical element displaying process displays the graphical element, according to one embodiment disclosed herein.

FIG. 5 is a flowchart of the steps performed by the graphical element displaying process 140-2 when it displays the graphical element 155 and receives a command to display the graphical sub-element 160 associated with the graphical element 155, according to one embodiment disclosed herein. The graphical element displaying process 140-2 allows a user 108 to expand graphical element 155 within a storyboard 150 to view the graphical sub-elements 160 associated with that element. This allows the user 108 to view the graphical sub-elements 160 alongside the other graphical elements 155 in the context of the storyboard 150.

In step 200, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 201, the graphical element displaying process 140-2 receives a command to display at least one graphical sub-element 160 associated with the graphical element 155. In an example configuration, a user 108 selects the graphical element 155 to display the graphical sub-elements 160.

In step 202, the graphical element displaying process 140-2 replaces the display of the graphical element 155 with a display of at least one graphical sub-element 160 associated with the graphical element 155. In an example configuration, a graphical element 155 can have more than one graphical sub-element 160 associated with the graphical element 155. FIG. 2 displays a storyboard 150 where one of the graphical elements 155 has been expanded to display two graphical sub-elements 160 associated with the graphical element 155. The storyboard 150 still contains the two transition effects 190 used to transition the storyboard from one graphical element 155 to the next graphical element 155 within the sequence of graphical elements 155.

In step 203, the graphical element displaying process 140-2 implements at least one graphical sub-element 160 such that execution of the graphical element 155 invokes execution of at least one graphical sub-element 160 associated with the graphical element 155. During the execution of the storyboard 150, each graphical element 155 in the sequence of graphical elements 155 is executed (i.e., displayed within the storyboard). When a graphical element 155 to which graphical sub-elements 160 are associated, is executed, those graphical sub-elements 160 are executed (i.e., displayed within the storyboard). For example, a graphical element 155 could have a video graphical sub-element 160 associated with the graphical element 155. When the graphical element 155 is executed, the video 180 associated with the graphical element 155 is played. In other words, regardless of whether the graphical sub-elements 160 are displayed within the storyboard 150, those graphical sub-elements 160 are still executed when the graphical element 155 is executed. However, when the graphical sub-elements 160 are displayed during execution, a user 108 can track the execution of each graphical sub-element 160 within the storyboard 150 as those graphical sub-elements 160 are executed. In an example configuration, the graphical sub-elements 160 may be multiple photos or videos in a sequence. The user 108 may expand one graphical element 155 to view a sequence of, for example, ten thumbnails, each thumbnail representing a video or photo that will play when the graphical element 155 is executed.

In step 204, the graphical element displaying process 140-2 receives a command to display the graphical element 155. In an example configuration, the storyboard 150 is displaying the graphical sub-elements 160 associated with a given graphical element 155. To view that graphical element 155, a user 108 can select a command to view the graphical element 155 to which the graphical sub-elements 160 are associated.

In step 205, the graphical element displaying process 140-2 replaces the display of at least one graphical sub-element 160 associated with the graphical element 155 with the display of the graphical element 155. The storyboard 150 now displays the graphical element 155 to which the graphical sub-elements 160 are associated.

Figure 6:
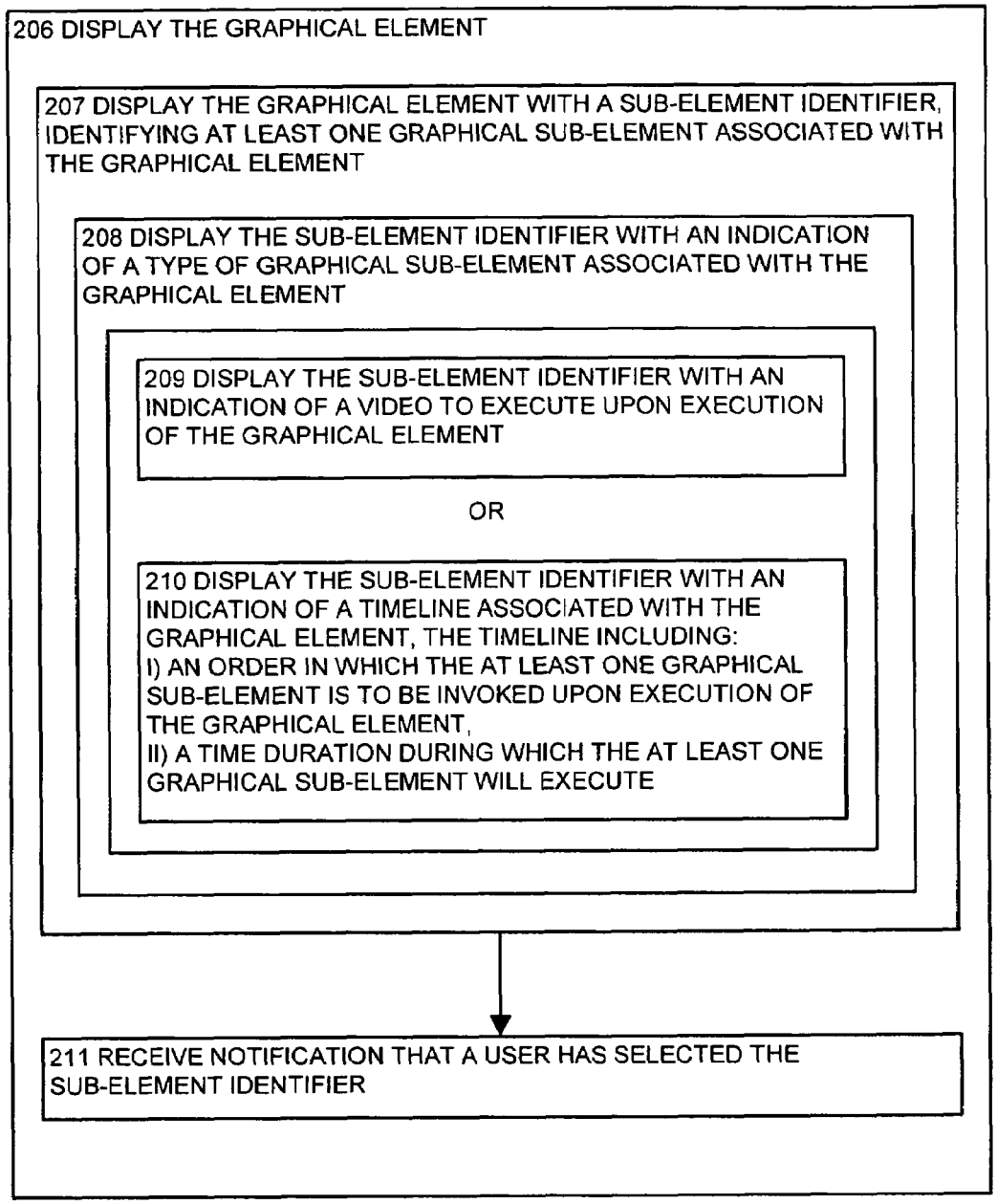
FIG. 6 illustrates a flowchart of a procedure performed by the system of FIG. 1 when the graphical element displaying process displays the graphical element, according to one embodiment disclosed herein.

FIG. 6 is a flowchart of the steps performed by the graphical element displaying process 140-2 when it displays the graphical element 155 having at least one graphical sub-element 160 associated with the graphical element 155, according to one embodiment disclosed herein. The graphical element 155 is displayed with an indication that a graphical sub-element 160 is associated with the graphical element 155.

In step 206, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 207, the graphical element displaying process 140-2 displays the graphical element 155 with a sub-element identifier 165, identifying at least one graphical sub-element 160 associated with the graphical element 155. The sub-element identifier 165 associated with the graphical element 155 indicates that at least one graphical sub-element 160 is associated with the graphical element 155

In step 208, the graphical element displaying process 140-2 displays the sub-element identifier 165 with an indication of a type 175 of graphical sub-element 160 associated with the graphical element 155. The type 175 of graphical sub-element 160 associated with the graphical element 155 could be a video, visual effect, song, etc.

In step 209, the graphical element displaying process 140-2 displays the sub-element identifier 165 with an indication of a video 180 to execute upon execution of the graphical element 155. In an example configuration, the type of graphical sub-element 160 associated with the graphical element 155 is a video 180 that runs when the graphical element 155 (to which the video 180 is associated) is executed within the storyboard 150. FIG. 3 displays an example configuration of a storyboard 150 where a video 180 is a graphical sub-element 160 associated with a graphical element 155. The graphical element 155 has an indication of a type 175 of graphical sub-element 160 associated with the graphical element 155. In this example the indication of a type 175 of graphical sub-element 160 is a film-tracking icon on either side of the graphical element 155.

Alternatively, in step 210, the graphical element displaying process 140-2 displays the graphical sub-element 160 with an indication of a timeline 185 associated with the graphical element 155. The timeline 185 includes an order in which at least one graphical sub-element 160 is to be invoked upon execution of the graphical element 155, and a time duration during which at least one graphical sub-element 160 will execute. FIG. 4 displays an example configuration of a storyboard 150 where a timeline 185 is a graphical sub-element 160 associated with a graphical element 155. In this example, the timeline 185 lists a plurality of graphical sub-elements 160 associated with the graphical element 155, and order in which those graphical sub-elements 160 are to execute, and time duration during which each graphical sub-element 160 will execute.

In step 211, the graphical element displaying process 140-2 receives notification that a user 108 has selected the graphical sub-element 160. In an example configuration, a graphical element 155 within the storyboard 150 has a sub-element identifier 165 associated with the graphical element 155. The graphical element displaying process 140-2 receives notification that a user 108 has selected the sub-element identifier 165, and the graphical element displaying process 140-2 replaces the display of the graphical element 155 with a display of at least one graphical sub-element 160 associated with the graphical element 155.

FIG. 7 is a flowchart of the steps performed by the graphical element displaying process 140-2 when it displays the sub-element identifier with an indication of a type 165 of graphical sub-element 160 associated with the graphical element 155, and that type of graphical sub-element 160 is a visual effect, according to one embodiment disclosed herein.

In step 212, the graphical element displaying process 140-2 displays the sub-element identifier 165 with an indication of a type 175 of graphical sub-element 160 associated with the graphical element 155. The type 175 of graphical sub-element 160 associated with the graphical element 155 could be a video, visual effect, song, etc.

In step 213, the graphical element displaying process 140-2 displays the sub-element identifier 165 with an indication of a visual effect to execute upon execution of the graphical element. For example, a visual effect could be the graphical element 155 expanded to show multiple graphical sub-elements 160 indicating the multiple stages of the graphical element 155.

In step 214, the graphical element displaying process 140-2 displays the sub-element identifier 165 with an indication of a visual effect of a "pan and zoom" effect on the graphical element 155. During a "pan and zoom" visual effect, a first area 193 of the graphical sub-element 160 expanded to fill the area previously occupied by the associated graphical element 155, followed by a movement to a second area 195 of the graphical sub-element 160 where the second area 195 fills the area previously occupied by the associated graphical element 155.

Figure 8:
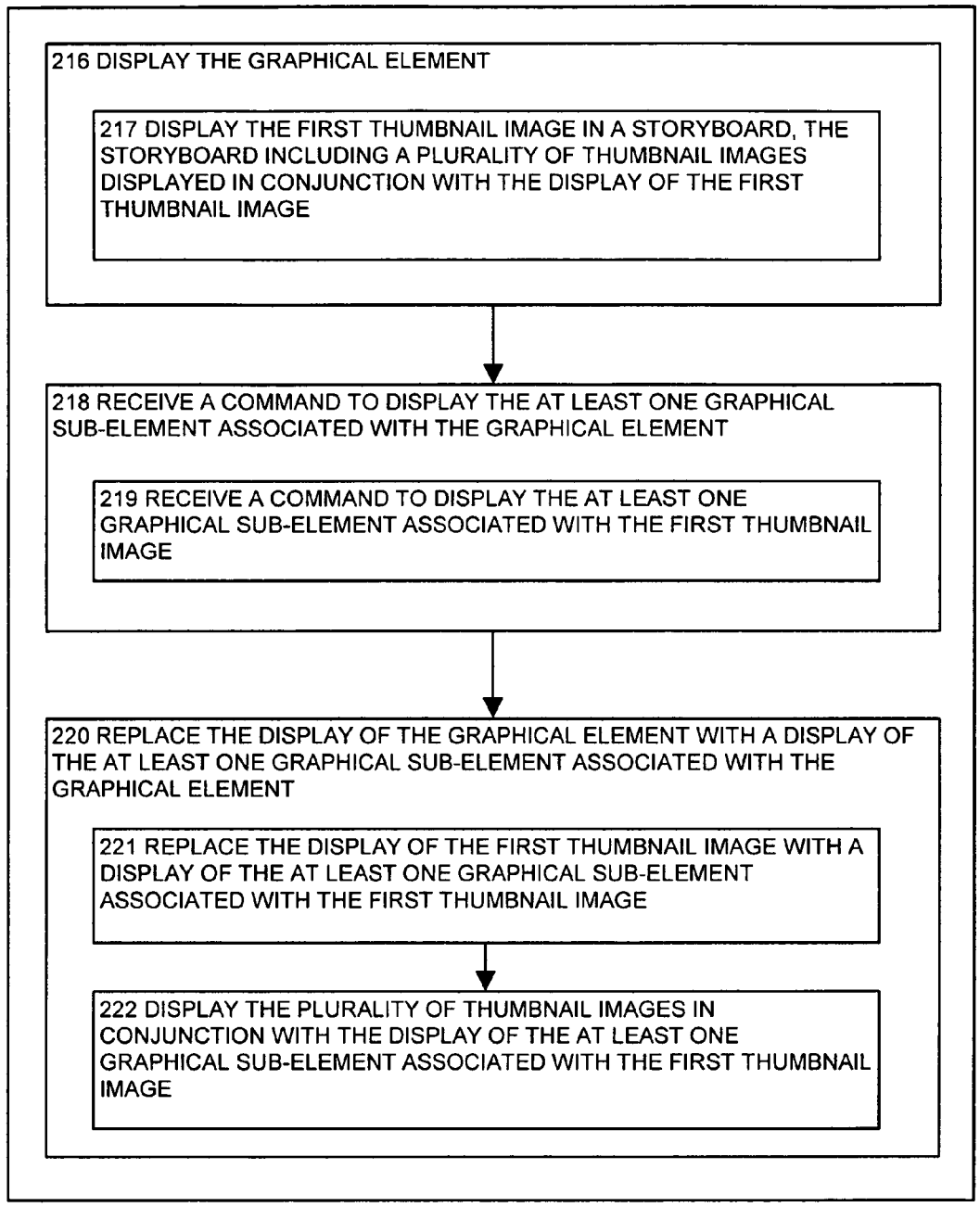
FIG. 8 illustrates a flowchart of a procedure performed by the system of FIG. 1 when the graphical element displaying process displays the graphical element, according to one embodiment disclosed herein.

FIG. 8 is a flowchart of the steps performed by the graphical element displaying process 140-2 when it displays the graphical element 155, and receives a command to display the graphical sub-element 160 associated with the graphical element 155, according to one embodiment disclosed herein. The graphical element displaying process 140-2 allows a user 108 to expand graphical element 155 within a storyboard 150 to view the graphical sub-elements 160 associated with that element. This allows the user 108 to view the graphical sub-elements 160 alongside the other graphical elements 155 in the context of the storyboard 150.

In step 216, the graphical element displaying process 140-2 displays the graphical element 155. FIG. 2 displays a storyboard 150 with three graphical elements 155 and two transition effects 190. The transition effects 190 are used to transition the storyboard 150 from one graphical element 155 to the next graphical element 155 within the sequence of graphical elements 155.

In step 217, the graphical element displaying process 140-2 displays graphical element 155 as a first thumbnail image in a storyboard 150. The storyboard includes a plurality of thumbnail images (i.e., a plurality of graphical elements 155) displayed in conjunction with the display of the first thumbnail image. In other words, the storyboard 150 contains a sequence of graphical elements 155, the sequence including the first thumbnail image and the plurality of thumbnail images.

In step 218, the graphical element displaying process 140-2 receives a command to display at least one graphical sub-element 160 associated with the graphical element 155. In an example configuration, the graphical element displaying process 140-2 receives a command to display the graphical sub-elements 160 associated with the first thumbnail image.

In step 219, the graphical element displaying process 140-2 receives a command to display at least one graphical sub-element 160 associated with the first thumbnail image. In other words, a user 108 has selected a sub-element identifier 165 associated with the first thumbnail image, indicating the user wishes to view the graphical sub-elements 160 associated with the first thumbnail image.

In step 220, the graphical element displaying process 140-2 replaces the display of the graphical element 155 with a display of at least one graphical sub-element 160 associated with the graphical element 155. In an example configuration, the graphical element displaying process 140-2 replaces the display of the first thumbnail image with the graphical sub-element 160 associated with the first thumbnail image.

In step 221, the graphical element displaying process 140-2 replaces the display of the first thumbnail image with a display of at least one graphical sub-element 160 associated with the first thumbnail image. In an example configuration, the first thumbnail image is replaced with a timeline 185 detailing a plurality of thumbnail images to execute upon invocation of the timeline 185.

In step 222, the graphical element displaying process 140-2 displays the plurality of thumbnail images in conjunction with the display of at least one graphical sub-element 160 associated with the first thumbnail image. In other words, when a user 108 selects the sub-element identifier 165 associated with the first thumbnail image, the graphical sub-elements 160 associated with the first thumbnail image are displayed, alongside the plurality of thumbnail images that make up the storyboard 150. The graphical sub-elements 160 associated with the first thumbnail image replace the first thumbnail image within the storyboard 150. Likewise, when a user selects the element identifier 170 associated with the graphical sub-elements 160 (associated with the first thumbnail image), those graphical sub-elements 160 are replaced with the first thumbnail image within the storyboard 150.

Figure 9:
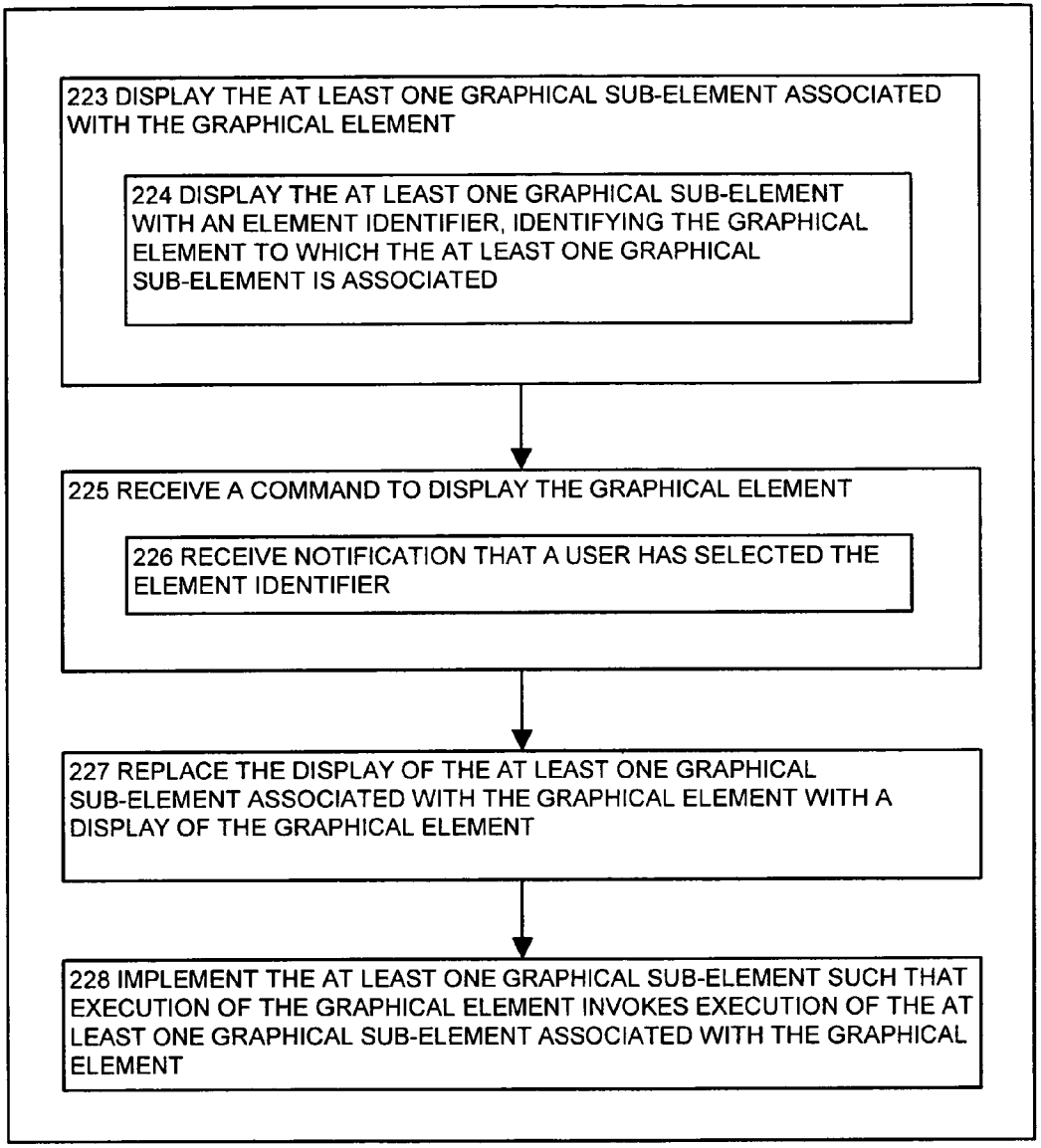
FIG. 9 illustrates a flowchart of a procedure performed by the system of FIG. 1 when the graphical element displaying process displays the at least one graphical sub-element associated with the graphical element, according to one embodiment disclosed herein.

FIG. 9 is a flowchart of the steps performed by the graphical element displaying process 140-2 when it displays at least one graphical sub-element 160 associated with the graphical element 155, according to one embodiment disclosed herein. The graphical sub-element 160 is displayed with an indication that it is associated with a graphical element 155.

In step 223, the graphical element displaying process 140-2 displays at least one graphical sub-element 160 associated with a graphical element 155. Within the storyboard 150, the graphical sub-elements 160 are displayed alongside any other graphical elements 155 (i.e., graphical elements 155 to which the graphical sub-element 160 is not associated).

In step 224, the graphical element displaying process 140-2 display the at least one graphical sub-element 160 with an element identifier 170, identifying the graphical element 155 to which at least one graphical sub-element 160 is associated. The element identifier 170 indicates that the graphical sub-element 160 is associated with a graphical element 155. In an example configuration, when a plurality of graphical sub-elements 160 are associated with a graphical element 155, only one element identifier 170 is associated with that plurality of graphical sub-elements 160.

In step 225, the graphical element displaying process 140-2 receives a command to display the graphical element 155. The graphical element displaying process 140-2 receives an indication to replace the graphical sub-element 160 with the graphical element 155 to which the graphical sub-element 160 is associated.

In step 226, the graphical element displaying process 140-2 receives notification that a user 108 has selected the element identifier 170. A graphical sub-element 160 or group of graphical sub-elements 160 has an element identifier 170 indicating that the graphical sub-element 160 or group of graphical sub-elements 160 is associated with a graphical element 155. In an example configuration, the graphical element displaying process 140-2 receives notification that a user 108 has selected the element identifier 170.

In step 227, the graphical element displaying process 140-2 replaces the display of at least one graphical sub-element 160 associated with the graphical element 155 with a display of the graphical element 155.

In step 228, the graphical element displaying process 140-2 implements at least one graphical sub-element 160 such that execution of the graphical element 155 invokes execution of at least one graphical sub-element 160 associated with the graphical element 155. During the execution of the storyboard 150, each graphical element 155 in the sequence of graphical elements 155 is executed (i.e., displayed within the storyboard). When a graphical element 155 to which graphical sub-elements 160 are associated, is executed, those graphical sub-elements 160 are executed (i.e., displayed within the storyboard). For example, a graphical element 155 could have a video graphical sub-element 160 associated with the graphical element 155. When the graphical element 155 is executed, the video 180 associated with the graphical element 155 is executed (i.e., the video 180 is run).

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method in which at least one computer system accesses instructions from computer storage and executes the instructions to perform steps comprising:
    displaying a plurality of graphical elements in a storyboard, the plurality of graphical elements comprises a plurality of image thumbnails;
    displaying a sub-element identifier with an indication of a pan-and-zoom effect to execute upon execution of a first image thumbnail, wherein displaying the indication includes displaying: (i) a first indication of the pan-and-zoom effect as a first area demarcated within the first image thumbnail and (ii) a second indication of the pan-and-zoom effect as a second area demarcated within the first image thumbnail;
    receiving a command to display at least one graphical sub-element associated with the first image thumbnail, wherein receiving the command includes: receiving a notification that a user has selected the sub-element identifier;
    upon receipt of the command, replacing a display of the first image thumbnail in the storyboard by expanding the first image thumbnail to display (i) a first graphical sub-element containing the first area demarcated by the first indication of the pan-and-zoom effect and (ii) a second graphical sub-element containing the second area demarcated by the second indication of the pan-and-zoom effect, the first and the second graphical sub-element each comprise a copy of the first image thumbnail;
    implementing the pan-and-zoom effect such that execution of the first image thumbnail invokes execution of the pan-and-zoom effect; and
    concurrently displaying the plurality of image thumbnails in the storyboard as the pan-and-zoom effect is displayed after expanding the first image thumbnail, wherein displaying the sub-element identifier comprises:
    displaying the indication of the pan-and-zoom effect whereby the first area is expanded followed by a movement to the second area where the second area is expanded upon execution of the first image thumbnail.

2. The computer-implemented method of claim 1 comprising:
    receiving a command to display the first image thumbnail; and
    replacing the display of the first graphical sub-element and the second graphical sub-element associated with the first image thumbnail with the display of the first image thumbnail.

3. The computer-implemented method of claim 1 wherein displaying the sub-element identifier comprises:
    displaying the sub-element identifier with an indication of a video to execute upon execution of the first image thumbnail.

4. The computer-implemented method of claim 1 wherein displaying the sub-element identifier comprises:
    displaying the sub-element identifier with an indication of a timeline associated with the first image thumbnail, the timeline including:
        i) an order in which the pan-and-zoom effect is to be invoked upon execution of the first image thumbnail; and
        ii) a time duration during which the pan-and-zoom effect will execute.

5. The computer-implemented method of claim 1 further comprising:
    displaying a second image thumbnail after the first image thumbnail; and
    displaying a transitional effect displayed between the first image thumbnail and the second image thumbnail.

6. The computer-implemented method as in claim 1, further comprising:
    wherein replacing the display of the first image thumbnail includes:
    after expanding the first image thumbnail, displaying the first graphical sub-element and the second graphical sub-element effect at a particular position of the first image thumbnail in the storyboard.

7. The computer-implemented method as in claim 1, wherein displaying the sub-element identifier includes:
    displaying the sub-element identifier within the storyboard at a display position located next to an edge of the first image thumbnail, the sub-element identifier representing a functionality to expand the first image thumbnail.

8. The computer-implemented method as in claim 1, wherein expanding the first image thumbnail within the storyboard includes:
    concurrently displaying the first image thumbnail and the first graphical sub-element and the second graphical sub-element upon receiving selection of the sub-element identifier associated with the first image thumbnail, the sub-element identifier representing a functionality to expand the first image thumbnail.

9. The computer-implemented method as in claim 1, comprising:
    upon expanding the first image thumbnail, replacing display of the sub-element identifier with display of an element identifier, the element identifier representing functionality for collapsing the expanded first image thumbnail.

10. The computer implemented method as in claim 9, wherein replacing display of the sub-element identifier with display of the element identifier includes:
    terminating display of the sub-element identifier; and
    displaying the element identifier within a region of the storyboard currently displaying the first graphical sub-element and the second graphical sub-element.

11. The computer implemented method as in claim 9, comprising:
    terminating display of the sub-element identifier;
    displaying the element identifier contained within display of the first graphical sub-element and the second graphical sub-element; and
    upon receiving selection of the element identifier, collapsing the expanded first image thumbnail to terminate display of (i) the first graphical sub-element and the second graphical sub-element and (ii) the element identifier within the storyboard.

12. The computer-implemented method as in claim 1, comprising:
    upon selection of the sub-element identifier:
        replacing display of the first image thumbnail with display of an expanded version of the first area and an expanded version of the second area; and
        replacing display of the sub-element identifier with an element identifier, the element identifier representing functionality for terminating display of (i) the expanded version of the first area and (ii) the expanded version of the second area.

13. A computerized device comprising:
a memory;
a processor;
a communications interface;
an interconnection mechanism coupling the memory, the processor and the communications interface;
wherein the memory is encoded with a graphical element displaying application that performs the operations comprising:
displaying a plurality of graphical elements in a storyboard, the plurality of graphical elements comprises a plurality of image thumbnails;
displaying a sub-element identifier with an indication of a pan-and-zoom effect to execute upon execution of a first image thumbnail, wherein displaying the indication includes displaying: (i) a first indication of the pan-and-zoom effect as a first area demarcated within the first image thumbnail and (ii) a second indication of the pan-and-zoom effect as a second area demarcated within the first image thumbnail;
receiving a command to display at least one graphical sub-element associated with the first image thumbnail, wherein receiving the command includes: receiving a notification that a user has selected the sub-element identifier;
upon receipt of the command, replacing a display of the first image thumbnail in the storyboard by expanding the first image thumbnail to display (i) a first graphical sub-element containing the first area demarcated by the first indication of the pan-and-zoom effect and (ii) a second graphical sub-element containing the second area demarcated by the second indication of the pan-and-zoom effect, the first and the second graphical sub-element each comprise a copy of the first image thumbnail;
implementing the pan-and-zoom effect such that execution of the first image thumbnail invokes execution of the pan-and-zoom effect; and
concurrently displaying the plurality of image thumbnails in the storyboard as the pan-and-zoom effect is displayed after expanding the first image thumbnail, wherein displaying the sub-element identifier comprises:
displaying the indication of the pan- and -zoom effect whereby the first area is expanded followed by a movement to the second area where the second area is expanded upon execution of the first image thumbnail.

14. The computerized device of claim 13 wherein the computerized device performs the operations of:
receiving a command to display the first image thumbnail; and
replacing the display of the first graphical sub-element and the second graphical sub-element associated with the first image thumbnail with the display of the first image thumbnail.

15. The computerized device of claim 13 wherein wherein displaying the sub-element identifier comprises:
displaying the sub-element identifier with an indication of a video to execute upon execution of the first image thumbnail.

16. The computerized device of claim 13 wherein wherein displaying the sub-element identifier comprises:
displaying the sub-element identifier with an indication of a timeline associated with the first image thumbnail, the timeline including:
i) an order in which the pan-and-zoom effect is to be invoked upon execution of the first image thumbnail; and
ii) a time duration during which the pan-and-zoom effect will execute.

17. The computerized device of claim 13 wherein the computerized device further performs operations comprising:
displaying a second image thumbnail after the first image thumbnail; and
displaying a transitional effect between the first image thumbnail and the second image thumbnail.

18. The computerized device of claim 13, comprising:
upon selection of the sub-element identifier:
replacing display of the first image thumbnail with display of an expanded version of the first area and an expanded version of the second area; and
replacing display of the sub-element identifier with an element identifier, the element identifier representing functionality for terminating display of (i) the expanded version of the first area and (ii) the expanded version of the second area.

19. The computerized device as in claim 13 comprising:
upon expanding the first image thumbnail, replacing display of the sub-element identifier with display of an element identifier, the element identifier representing functionality for collapsing the expanded first image thumbnail.

20. The computerized device as in claim 19 wherein replacing display of the sub-element identifier with display of the element identifier includes:
terminating display of the sub-element identifier; and
displaying the element identifier within a region of the storyboard currently displaying the first graphical sub-element and the second graphical sub-element.

21. The computerized device as in claim 19 comprising:
terminating display of the sub-element identifier;
displaying the element identifier contained within display of the first graphical sub-element and the second graphical sub-element; and
upon receiving selection of the element identifier, collapsing the expanded first image thumbnail to terminate display of (i) the first graphical sub-element and the second graphical sub-element and (ii) the element identifier within the storyboard.

22. A computer readable storage medium encoded with computer programming logic that when executed in a computerized device performs operations comprising:
displaying a plurality of graphical elements in a storyboard, the plurality of graphical elements comprises a plurality of image thumbnails;
displaying a sub-element identifier with an indication of a pan-and-zoom effect to execute upon execution of a first image thumbnail, wherein displaying the indication includes displaying: (i) a first indication of the pan-and-zoom effect as a first area demarcated within the first image thumbnail and (ii) a second indication of the pan-and-zoom effect as a second area demarcated within the first image thumbnail;
receiving a command to display at least one graphical sub-element associated with the first image thumbnail, wherein receiving the command includes: receiving a notification that a user has selected the sub-element identifier;
upon receipt of the command, replacing a display of the first image thumbnail in the storyboard by expanding the first image thumbnail to display (i) a first graphical sub-element containing the first area demarcated by the first indication of the pan-and-zoom effect and (ii) a second graphical sub-element containing the second area demarcated by the second indication of the pan-and-zoom effect, the first and the second graphical sub-element each comprise a copy of the first image thumbnail;

implementing the pan-and-zoom effect such that execution of the first image thumbnail invokes execution of the pan-and-zoom effect; and concurrently displaying the plurality of image thumbnails in the storyboard as the pan-and-zoom effect is displayed after expanding the first image thumbnail, wherein displaying the sub-element identifier comprises:

displaying the indication of the pan- and -zoom effect whereby the first area is expanded followed by a movement to the second area where the second area is expanded upon execution of the first image thumbnail.

* * * * *